Dec. 15, 1970 D. T. ELLIS 3,548,389

TRANSISTOR ASSOCIATIVE MEMORY CELL

Filed Dec. 31, 1968 2 Sheets-Sheet 1

INVENTOR
DAVID T. ELLIS

INVENTOR
DAVID T. ELLIS

United States Patent Office 3,548,389
Patented Dec. 15, 1970

3,548,389
TRANSISTOR ASSOCIATIVE MEMORY CELL

David T. Ellis, Holliston, Mass., assignor to Honeywell Inc., Minneapolis, Minn., a corporation of Delaware Filed Dec. 31, 1968, Ser. No. 788,271
Int. Cl. G11c *11/40, 15/00;* H03k *3/286*
U.S. Cl. 340—173 10 Claims

ABSTRACT OF THE DISCLOSURE

Flip-flop memory element associative memory array acomplishes write, sense and interrogate logical functions through a word select/interrogation sense line and an interrogate line associated with each word and a pair of word select line actuated write/sense transistors each coupling, by their conduction paths, the outputs of each memory element to the digit/sense lines. A second pair of transistors have their control electrodes coupled to the outputs of each memory element thereby reflecting the binary state of such memory element by the conductive state of their output electrodes. A third pair of transistors having their control electrodes coupled to the digit/sense lines and their input electrodes coupled to the output electrodes of the second pair of transistors have their output electrodes coupled to the word select/interrogation sense line through the conduction path of a single transistor controllably operated by the interrogation line. Signals coupled to the control electrodes of the second and third pair of transistors may be interchanged. Interrogation is accomplished, by the second and third transistor pairs, when the single transistor is rendered conductive, by a comparison of the state of the memory element and an interrogation state applied to the digit sense lines. An output current on the word select/interrogation sense line indicates a mismatch.

BACKGROUND AND OBJECTS OF THE INVENTION

The present invention pertains generally to the field of memory storage devices and more particularly to associative memory cells that employ transistors, preferably of the field effect type.

An associative memory, also referred to as a content-addressed memory, is a memory in which stored information is located, e.g. for retrieval or modification, by describing the information, e.g. specifying its name. This is in contrast to more conventional memories in which stored information is located by specifying its location, i.e. its addres, within the memory. Hence, with an associative memory, stored information is selected by comparing the contents of every location with a particular information word of interest. In an elementary example where the information of interest is a word consisting of all ZEROS, during an interrogation routine the whole memory is sensed for location storing this word. Any location storing the all-ZERO word will then be identified. In addition, an associative memory is operated to read information from, and write information into, an addressed location. Associative memories typically are fabricated from a large number of identical bistable memory cells connected in a rectangular array.

Associative memories have long been of interest for use in computer systems. Recently, the lower cost fabrication of these memories by extensive use of integrated circuit techniques has heightened their popularity. Howeven, prior designs for integrated circuit associative memories, and of their constituent memory cells, require relatively numerous connections to each cell. It is desirable to minimize these connections to save costly space on integrated circuit chips, for today a large number of memory cells are fabricated on a single semiconductor chip. Reducing the number of external connections is further desired because it eventually reduces the number of connections that must be made to connect the chip with other equipment.

For example, U.S. Pat. No. 3,390,382 discloses, in one instance, an associative memory cell constructed with six or eight transistors and requiring five external connections plus grounds and supply voltages. The patent also discloses how two external leads can be omitted at the cost of our additional transistors per cell. Further, the latter circuit operates with tri-level, and not binary, signals.

However, circuits for generating tri-level signals generally have marginal operation due to inherent threshold-variation problems. These can usually be alleviated only by resort to matched components having similar threshold characteristics.

It is, therefore, an object of this invention to provide an associative memory cell having a minimal number of leads to external devices.

Another object is to provide such a memory cell that attains reliable operation simply with binary signals.

It is also an object of the invention to provide a memory cell of the above character that employs relatively few components.

It is a further object of this invention to provide an associative memory cell of the above character that operates with relatively low power consumption.

It is a still further object of this invention to provide an associative memory cell for non-destruct readout operation, particularly during an interrogation routine.

An overall object is to provide an associative memory that is more economical than those heretofore available.

Other objects will in part be obvious and will in part appear hereinafter.

SUMMARY OF THE INVENTION

These and other objects are satisfied in the present invention by providing an associative memory cell having a first pair of transistors, preferably of the field effect type, cross-coupled to form a bistable element which will be hereinafter referred to as a flip-flop. A second pair of transistors provides means for reading out of, and writing into, this flip-flop. Third and fourth pairs of transistors in conjunction with a single interrogation transistor provide means for implementing the interrogation operation. Each transistor has three electrodes, which may be designated first, second and third electrodes. For the case of a field effect transistor these would be referred to as the drain, gate and source electrodes, respectively. Of course, as is known, the source and drain electrodes of a field effect transistor are interchangeable, for it is a symmetrical, reversible device.

With the flip-flop as the basic storage element, the remaining transistors in each cell are connected as follows: Each transistor in the second pair thereof has a first electrode connected to an associated output terminal of the flip-flop; a second electrode connected to a word select line, and the third electrode connected via a separate digit/sense line to external circuitry. The transistors in the third pair are arranged so that each has a first electrode connected to a supply terminal; the second electrode connected to an associated output terminal of the flip-flop, and the third electrode connected to the first electrode of each transistor of the fourth pair of transistors. Each transistor in the fourth pair further has a second electrode connected to separate digit/sense lines, and the third electrode connected to the first electrode of the single interrogation transistor. The second electrode of this single transistor is connected to receive an interrogation request signal while the third electrode is coupled to the word select line. Thus, each cell has only four external connections, one to a word select line, two to different digit/sense lines, and one to an interrogation line.

As previously mentioned, information is read out of and written into the cell by means of the second transistor pair. A word select signal effectively ties the flip-flop to the digit/sense lines during this mode of operation, so that information can be retrieved from the flip-flop or written into it.

The interrogation operation is performed by applying an interrogation signal to the single interrogation transistor and comparing the state of the flip-flop with binary signals applied to the digit/sense lines. These signals represent the state of an external circuit usually. The third and fourth transistor pairs cause an interrogation sense signal on the word select line only when there is a mismatch. That is, only when the state of the flip-flop differs from the state represented on the digit/sense lines is a current sensed in the word select line.

The advantages of the foregoing configuration of the present invention are that there are a minimal number of leads for connection from the cell to external circuitry, yet this is accomplished without having to use multi-level word select/interrogate signals. Further, non-destruct readout is provided during interrogation due to placement of the third and fourth transistor pairs and the single interrogation transistor thereby providing total isolation between the applied interrogation signal and the state of the flip-flop. These advantages and others will become more apparent upon reading the accompanying detailed description in connection with the drawings, in which:

DETAILED DESCRIPTION

Figure 1:
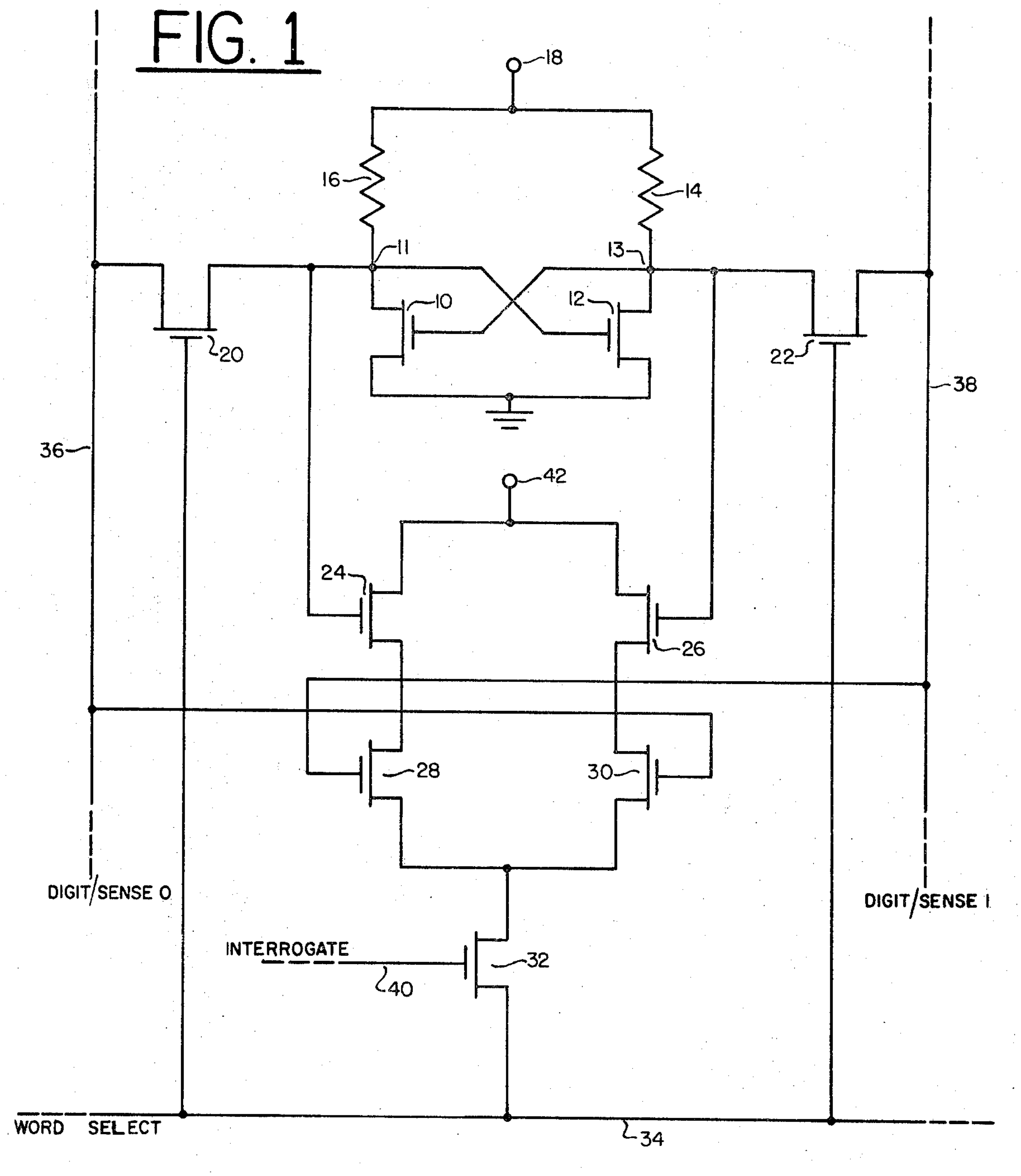
FIG. 1 is a circuit diagram showing a memory cell in accordance with the principles of the present invention.

Although the memory cells of the present invention may employ a variety of types of transistors, FIG. 1 shows a preferred embodiment constructed with MOS (metal oxide semiconductor) field effect transistors. These are fabricated in the following manner.

Two p-type regions are formed within an n-type silicon substrate by a diffusion process. These two p-type regions are then bridged by means of a metal gate insulated from the substrate by a silicon oxide film grown on the surface of the substrate. A lead is brought out from each p-type region, one lead being referred to as the drain electrode and the other being referred to as the source electrode. The remaining terminal, which is connected to the metal gate, is referred to as the gate electrode.

The characteristics of these devices are such that the impedance between the drain and source electrodes is regulated through the application of a voltage to the gate electrode. The voltage impressed on the gate electrode, therefore, determines the value of current flowing betwen the drain and source while a fixed voltage is applied between the drain and source electrodes. For example, if the source is grounded and the drain has a negative voltage applied thereto, a current commences to flow between the drain and source electrodes when the gate voltage exceeds a certain negative value commonly referred to as the threshold voltage and ordinarily designated by the symbol $V_T$. A typical value of $V_T$ is between three and four volts.

Referring to FIG. 1, there is depicted an associative memory cell designed in accordance with the present invention. All of the transistors shown are of the MOS field effect type; however, it is understood that other types of transistors could be substituted therefor. Transistors 10 and 12, together with resistors 14 and 16, form a flip-flop, i.e. a bistable element capable of being driven to either one of two stable states and further capable of remaining in the state to which it is driven for an indefinite time. The source electrodes of transistors 10 and 12 are grounded, while the gate electrodes are cross-coupled to the opposite drain electrodes. Resistors 14 and 16 are connected between terminal 18, which has a DC voltage applied thereto, and the drain electrodes, as shown, and output terminals 11 and 13, which are also connected to respective drain electrodes, define the outputs of the flip-flop.

Figure 1A:
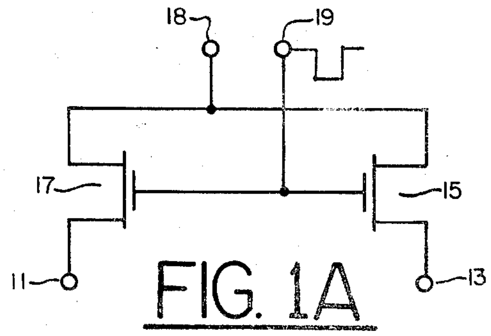
FIG. 1A is an alternative embodiment for a portion of the memory cell of FIG. 1.

FIG. 1A shows an alternative embodiment that can be substituted for the FIG. 1 resistors 14 and 16 between output terminals 11, 13 and terminal 18, to provide low power operation. Generally speaking, using the embodiment of FIG. 1A provides low power dissipation due to the fact that the circuit can be operated at a relatively low duty cycle. This low duty cycle operation is possible, in turn, because MOS transistors are inherently high impedance devices and because they can store the charge on their gate capacitance for a sufficient time interval. In relating this to FIG. 1A, operation at a lower duty cycle is possible by pulsing terminal 19 instead of applying a steady voltage to it. The repetition rate must be sufficiently high so that neither gate electrode of transistors 10 nor 12 loses its charge. For example, the power supply connected to terminal 18 could have a value of −9 volts while terminal 19 received a −14 volt pulse at a repetition rate of 10 kHz.

With further reference to FIG. 1, the transistor pair including transistors 20 and 22 is used during read-write operation to write information into the flip-flop and to retrieve information therefrom. The source electrodes of transistors 20 and 22 connect, respectively, to terminals 11 and 13. The gate electrodes tie together at a common point to the word select line 34. Finally, digit/sense lines 36 and 38 connect, respectively, to the drain electrodes of transistors 20 and 22. Operation in the read-write mode as well as in the interrogate mode is summarized in Table I below. Table I also shows the necessary voltage levels to perform a masked write and interrogate. For instance, if it is not desired to write into a particular cell contained in the selected word, the −V levels on lines 36 and 38 assure that the flip-flop does not change state. During a masked interrogate, on the other hand, the 0 levels on lines 36 and 38 prevent any contribution to an interrogation sense current on line 34 regardless of the state of the flip-flop.

TABLE I

| Operation | Input line | | | | Output |
|---|---|---|---|---|---|
| | I | W | DS0 | DS1 | |
| WRITE ZERO | 0 | −V | −V | 0 | |
| WRITE ONE | 0 | −V | 0 | −V | |
| MASKED WRITE | 0 | −V | −V | −V | |
| READ ZERO | 0 | −V | −V | −V | Current in DS1. |
| READ ONE | 0 | −V | −V | −V | Current in DS0. |
| ZERO INTERROGATE | −V | 0 | −V | 0 | |
| | | If cell stores 0 | | | No current in W. |
| | | If cell stores 1 | | | Current in W. |
| ONE INTERROGATE | −V | 0 | 0 | −V | |
| | | If cell stores 0 | | | No current in W. |
| | | | | | Current in W. |
| MASKED INTERROGATE | −V | 0 | 0 | 0 | |
| | | If cell stores 1 | | | No current in W. |
| | | If cell stores 0 | | | Do. |

In the terms of Table I, the memory cell stores a ONE when transistor 10 is on and transistor 12 if off, and stores a ZERO when transistor 10 is off and transistor 12 is on. Therefore, when a WRITE ZERO operation is performed, as indicated in the "INPUT LINE" column of the table, interrogate (I) line 40 is held at ground (this holds transistor 32 off, word select (W) line 34 is activated by applying a —V (—20 volts, for example) to it, and the digit/sense (DS0, DS1) lines 36 and 38, respectively, receive —V and 0 voltage levels. The negative voltage applied from the word select line to the gate electrodes of transistors 20 and 22 renders them capable of conduction. Hence, the negative voltage impressed on digit/sense line 36 is fed to terminal 11 and causes transistor 12 to conduct and transistor 10 to turn off. The flip-flop then is in the store ZERO condition, as prescribed by the WRITE ZERO operation.

For the WRITE ONE operation a similar sequence occurs except that line 38 receives a negative voltage instead of line 36. This causes transistor 10 to conduct and transistor 12 to turn off, thereby indicating storage of a binary ONE.

The voltages applied to the interrogate (I), word select (W), and digit/sense (DS0 DS1) lines as listed in the table are produced by conventional devices external to the FIG. 1 memory cell.

The read operation is also performed by applying 0 volt to interrogate line 40 and —V to word select line 34. For the read operation, we do not want to disturb the state of the flip-flop, but instead want to detect its state by sensing a current in either digit/sense line 36 or 38. To perform the read operation, therefore, negative voltages are applied to both digit/sense lines, as listed in the fourth and fifth lines of the table. Transistors 20 and 22 are capable of conduction by virtue of the negative signal on line 34 and if the flip-flop is storing a ONE, a current occurs in line 36 because of the potential difference between line 36 and the essentially ground potential transistor 10 applies to terminal 11. For this READ ONE operation the potential difference between line 38 and terminal 13 is insufficient to cause significant conduction, so no current is sensed in line 38.

The READ ZERO operation is similar to the READ ONE operation except that the cell is storing a ZERO and hence a current is sensed in line 38 instead of line 36. Again, this is due to the potential difference existing between line 38 and terminal 13, which difference does not exist between line 36 and terminal 11.

Note that the foregoing read operations are nondestructive, as desired.

Consider next the interrogation mode of operation, wherein it is desired to compare the state of the flip-flop with a condition impressed on lines 36 and 38. Although lines 36 and 38 have been referred to as digit/sense lines, they serve an additional purpose during interrogation and might be more aptly referred to as digit/sense interrogate lines.

The implementation of the interrogation operation is shown in FIG. 1 to include a third transistor pair comprising transistors 24 and 26, a fourth transistor pair comprising transistors 28 and 30, and interrogating transistor 32. The gate electrode of transistor 24 is coupled to terminal 11 of the flip-flop, whereas the gate electrode of transistor 26 is coupled to terminal 13 of the flip-flop. The drain electrodes of transistors 24 and 26 are both tied to terminal 42 which has a DC voltage applied thereto, the value of which can be —2.5 volts, for example. The source electrodes of transistors 24 and 26 are connected, respectively, to the drain electrodes of transistors 28 and 30. The gate electrodes of transistors 28 and 30 connect respectively, to line 38 and line 36. Finally, the source electrodes of transistors 28 and 30 both connect to the drain electrode of transistor 32; transistor 32 having its gate electrode connected to interrogate line 40 and its source electrode connected to the word select line 34.

During interrogation, word line 34 is grounded as indicated in the table. This prevents conduction of transistors 20 and 22 and further provides a sense path for any current that might be conducted via transistor 32. Interrogate line 40 receives a negative voltage that renders transistor 32 capable of conduction. Transistors 24, 26, 28 and 30 form, in effect, a gating circuit that compares the state of the flip-flop (at the gate electrodes of transistors 24 and 26) with the state applied to lines 36 and 38 (at the gate electrodes of transistors 28 and 30). When these states differ, a current will be detected flowing via transistor 32, in word select line 34. It is thus seen that although line 34 has been called a word select line, it too performs the additional function of a sense line during the interrogation mode of operation. As such, it might be more aptly referred to as a word select/interrogation sense line.

Referring again to Table I, the interrogation operation is performed by grounding the word select line 34, applying a negative voltage to interrogate line 40 and also applying the desired voltage levels to lines 36 and 38. For example, if it is desired to ZERO INTERROGATE a negative voltage is applied to line 36 and line 38 is grounded. When the flip-flop stores a ONE, this is termed a mismatch and a current is sensed on line 34. Hence, in interrogating an entire word, the complete absence of any detected interrogation sense current indicates that the particular stored word matches the word impressed on each set of digit/sense lines. For a ZERO INTERROGATE with a stored ONE the operation is as follows. Transistor 32 is rendered capable of conduction due to the negative voltage on interrogate line 40. With a stored ONE, the gate electrode of transistor 24 is at ground and the gate electrode of transistor 26 is negative. The ZERO INTERROGATE levels on the digit/sense lines put a ground on the gate electrode of transistor 28 and a negative voltage on the gate electrode of transistor 30. Hence, a conduction path is provided between supply terminal 42 and word select line 34 via conduction transistors 26, 30 and 32. If, on the other hand, during a ZERO INTERROGATE, the state of the flip-flop is ZERO, the negative voltage is applied from terminal 11 to the gate electrode of transistor 24. With transistors 26 and 28 off, no conductive path is provided between terminal 42 and line 34. This is designated a match condition.

A ONE INTERROGATE operation is somewhat similar to a ZERO INTERROGATE in that a current is sensed only on line 34 when a mismatch occurs. During a ONE INTERROGATE, line 36 is held at ground while line 38 has a negative voltage applied thereto (see Table I). This being the case, transistor 28 is capable of conduction while transistor 30 is not. If the flip-flop is storing a ONE, terminal 13 is negative as is the gate electrode of transistor 26, and no current flows between terminal 42 and line 34. On the other hand, if a ZERO is stored in the flip-flop both transistors 24 and 28, as well as transistor 32, conduct providing a current in line 34.

Figure 2:
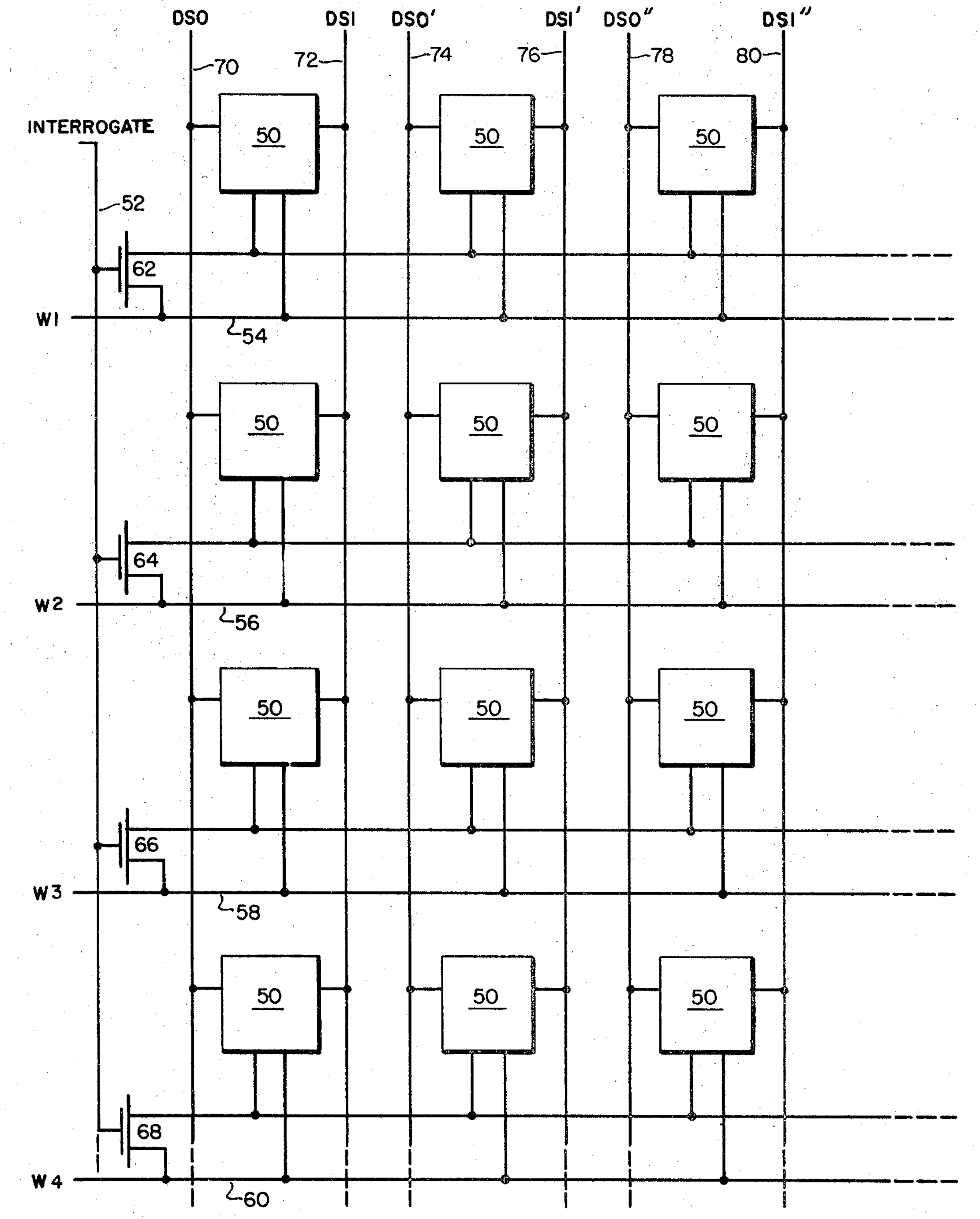
FIG. 2 is a schematic diagram showing an associative memory array of memory eclls according to FIG. 1.

Referring to FIG. 2, a typical four-word and three-bit per word portion of an associative memory array in accordance with the present invention has plural associative memory cells 50 each of which has two digit/sense lines 70–72, 74–76, or 78–80 connected to it along with a word select line and a line from the interrogation transistor. In FIG. 1 the cell was depicted as including the interrogation transistor 32. In FIG. 2 the cells 50 do not contain such a transistor but in lieu thereof, each word is considered as having a single interrogation transistor associated with it. This is shown in FIG. 2 with transistors 62, 64, 66 and 68. Hence, the FIG. 2 cells 50 are each identical to the FIG. 1 cell except that there is no transistor 32 (FIG. 1) in the cells 50; the one transistor 62, 64, 66 or 68 (FIG. 2) in the corresponding word-location of the array is connected in its stead.

The gate electrodes of transistors 62, 64, 66 and 68 are connected to interrogate line 52. The drain electrodes of these transistors are connected to their associated cells while the source electrodes connect, respectively, to word select lines 54, 56, 58 and 60. The connection of the digit/sense lines, word select lines and interrogate line to peripheral circuitry has not been shown as it is contemplated that conventional circuitry, such as sense amplifiers and drivers, can implement an entire associative memory system.

To minimize leads, only a single interrogation line 52 is brought out from the cell array. An interrogation signal, thus interrogates the entire array at the same time. Obviously separate segments of the array could also be sequentially interrogated by modifying the configuration of FIG. 2. These and other modifications will be apparent to those skilled in the art using the associative memory cell of the present invention.

From the foregoing it can be seen that the present invention attains worthy advantages. The dual use of function and sense lines, for example, reduces the number of leads that emanate from an entire array, i.e. the dual use of the word select and of the digit/sense lines as discussed hereinabove. In addition, this was accomplished without having to use multi-level function lines and therefore alleviates many of the marginal problems associated with that prior art technique. The configuration of FIG. 1 including transistors 24, 26, 28 and 30 provides good marginal operation without having to match transistors. These transistors are either capable of conduction or not, and do not depend on transistor threshold voltage drops for proper operation. In addition, the power consumption is low by using the gating circuit configuration of FIG. 1, i.e. transistors 24, 26, 28 and 30 with interrogating transistor 32. Also, a relatively low supply voltage can be applied to terminal 42, thereby attaining low power consumption in the conducting transistors. This is especially significant in the interrogation mode of operation where all cells are interrogated simultaneously.

It should further be understood that an associative memory element employing the principles of FIG. 1 may be modified in a variety of ways, some of which have previously been discussed. The MOS transistors may be replaced by other electronic equivalents, such as bipolar transistors. In addition thereto, different voltage levels can be used. The preceding description has been of a preferred embodiment of the present invention. Various changes and modifications will now be apparent to those skilled in the art. Therefore, this invention is to be interpreted, not by the specific disclosure herein, but only in view of the appended claims.

What is claimed is:

1. An associative memory element for connection via digit/sense lines to external circuitry and further adapted to receive an interrogation signal and a word select signal, said memory element comprising:

(a) a flip-flop circuit including a first transistor pair and having first and second terminal means at which it develops output signals and at which it receives input signals;

(b) a read-write circuit including a second pair of transistors, each of which has first, second and third electrodes, said first electrodes being connected, respectively, to said first and second terminals of said flip-flop circuit, said second electrodes adapted to receive said word select signal, and said third electrodes each connected via different digit/sense lines for connection to external circuitry; and (c) an interrogation circuit comprising third and fourth pairs of transistors, each of which has first, second and third electrodes and further having a connection to the respective digit/sense lines and a connection to the first and second terminal, respectively of said flip-flop circuit, said interrogation circuit adapted to receive interrogation signals that enable said interrogation circuit during an interrogation operation and inhibit it during a read-write operation and further adapted to generate an interrogation sense signal when the state of said flip-flop circuit does not match the state of signals that said digit/sense lines receive.

2. An associative memory element as defined in claim 1 in which said interrogation circuit has said third and fourth transistor pairs connected in a gating arrangement wherein the second electrodes of said third pair are connected, respectively, to the first and second output terminals of said flip-flop circuit, and wherein the second electrodes of said fourth pair are connected, respectively, to opposite digit/sense lines.

3. An associative memory element as defined in claim 2 wherein said interrogation circuit further comprises a single interrogation transistor having first, second and third electrodes, said first electrode being connected to said fourth pair of transistors, said second electrode being connected to receive said interrogation signal and said third electrode being connected to a word select line, said single transistor adapted to conduct current during an interrogation operation when a mismatch occurs, said current being sensed on said word select line.

4. An associative memory element as defined in claim 3 wherein the first electrodes of said third pair of transistors are commonly connected to a power source, and each third electrode thereof is connected to a first electrode of a respective one of said fourth pair of transistors, and wherein the third electrodes of said fourth pair of transistors are commonly connected to the first electrode of said single transistor.

5. An associative memory element as defined in claim 2 wherein said interrogation circuit further comprises a single interrogation transistor having first, second and third electrodes, said first electrode being connected to said third pair of transistors, said second electrode being connected to receive said interrogation signal and said third electrode connected to a word select line, said angle transistor adapted to conduct current during an interrogation operation when a mismatch occurs, said current being sensed on said word select line.

6. An associative memory element as defined in claim 5 wherein the first electrodes of said fourth pair of transistors are commonly connected to a power source, and each third electrode thereof is connected to a first electrode of a respective one of said third pair of transistors, and wherein the third electrodes of said third pair of transistors are commonly connected to the first electrode of said single transistor.

7. An associative memory element as defined in claim 1 further comprising a supply terminal for connection to an electrical source, and wherein said flip-flop circuit further includes an additional pair of transistors connected between the first and second terminals of said flip-flop circuit and said supply terminal.

8. An associative memory element as defined in claim 7 comprising a further supply terminal and wherein said additional pair of transistors have their first electrodes commonly connected to said supply terminal, their third electrodes connected, respectively, to the first and second terminals of said flip-flop circuit and their second electrodes commonly connected to said further supply terminal.

9. An associative memory element as defined in claim 8 wherein said further supply terminal is adapted to receive pulsed energy.

10. An associative memory array having plural memory cells arranged in rows and columns in a matrix configuration having ($m$) rows, each of which forms one word location, and having ($n$) columns, each of which stores one bit in each of said $(m)$ word locations, said array comprising:

(a) a pair of digit/sense lines per bit connected to each cell in the column;

(b) a word select line per word location connected to each cell of the row;

(c) an interrogation line; and (d) a single interrogation transistor per word location having first, second and third electrodes with the first electrode connected to each cell in the word location, the third electrode connected to the word select line associated with the particular word location and the second electrode connected to the interrogation line.

References Cited

UNITED STATES PATENTS

| | | | |
|---|---|---|---|
| 3,284,782 | 11/1966 | Burns | 340—173 |
| 3,490,007 | 1/1970 | Igarashi | 307—238X |

OTHER REFERENCES

F. A. Behnke, "Associative Memory Cell," IBM TDB, v. 10, n11, April 1968, pp. 1715–16.

BERNARD KONICK, Primary Examiner

J. F. BREIMAYER, Assistant Examiner

U.S. Cl. X.R.

307—279, 291